US012638291B2

(12) United States Patent
Hanson

(10) Patent No.: US 12,638,291 B2
(45) Date of Patent: May 26, 2026

(54) NAVIGATION SYSTEM USING CELESTIAL RADIO EMISSIONS

(71) Applicant: Wisconsin Alumni Research Foundation, Madison, WI (US)

(72) Inventor: Kael D. Hanson, Waunakee, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 260 days.

(21) Appl. No.: 18/230,327

(22) Filed: Aug. 4, 2023

(65) Prior Publication Data

US 2025/0044095 A1     Feb. 6, 2025

(51) Int. Cl.
*G01C 21/02*        (2006.01)
*G01C 21/00*        (2006.01)

(52) U.S. Cl.
CPC ........... *G01C 21/02* (2013.01); *G01C 21/005* (2013.01)

(58) Field of Classification Search
CPC ................. G01C 21/02–025; G01B 9/02–029
USPC .................................. 701/513; 33/268–271; 356/139.01–139.2; 244/3.18
See application file for complete search history.

(56) References Cited

U.S. PATENT DOCUMENTS

| | | | | |
|---|---|---|---|---|
| 4,763,418 A | * | 8/1988 | Decker, Jr. ............... | G01C 1/08 |
| | | | | 33/268 |
| 8,767,072 B1 | * | 7/2014 | Rosenwinkel ............ | G06T 7/74 |
| | | | | 348/148 |

| | | | | |
|---|---|---|---|---|
| 2005/0192719 A1 | * | 9/2005 | Sheikh ...................... | B64G 1/36 |
| | | | | 701/13 |
| 2006/0085130 A1 | * | 4/2006 | Belenkii .............. | G01C 21/025 |
| | | | | 701/468 |
| 2006/0227012 A1 | * | 10/2006 | He ........................ | G01C 23/005 |
| | | | | 340/945 |
| 2006/0276963 A1 | * | 12/2006 | Twitchell ............... | G01C 21/02 |
| | | | | 701/513 |
| 2007/0038374 A1 | * | 2/2007 | Belenkii .............. | G01C 21/025 |
| | | | | 701/4 |
| 2007/0109177 A1 | * | 5/2007 | Baath ...................... | G01S 13/88 |
| | | | | 342/25 C |
| 2009/0195467 A1 | * | 8/2009 | Vassilakis ............ | H01Q 1/1228 |
| | | | | 343/765 |
| 2015/0226827 A1 | * | 8/2015 | Aycock .................. | G06V 20/00 |
| | | | | 382/103 |
| 2017/0017534 A1 | * | 1/2017 | De Amici ............... | G06F 11/00 |
| 2017/0070279 A1 | * | 3/2017 | Cherubini ............ | H04B 7/0632 |
| 2017/0131096 A1 | | 5/2017 | Karlov et al. | |

(Continued)

FOREIGN PATENT DOCUMENTS

| | | |
|---|---|---|
| CN | 104075713 A | 10/2014 |
| KR | 20130031280 A | 3/2013 |

OTHER PUBLICATIONS

Knowles et al. "Applications of radio interferometry to navigation," NASA. Goddard Space Flight Center Proc. of the 5th Ann. NASA and DOD Precise Time and Time Interval Planning Meeting, Jan. 1, 1973 (Year: 1973).*

(Continued)

*Primary Examiner* — Erin M Piateski
*Assistant Examiner* — Paul Allen
(74) *Attorney, Agent, or Firm* — Boyle Fredrickson, S.C.

(57) ABSTRACT

A celestial guidance system uses radio imaging of celestial bodies including the galactic plane received by an interferometric antenna array to provide robust navigation during times of cloud cover or interrupted GPS service.

11 Claims, 3 Drawing Sheets

(56) References Cited

U.S. PATENT DOCUMENTS

| | | | |
|---|---|---|---|
| 2018/0259341 A1 | 9/2018 | Aboutalib et al. | |
| 2019/0331762 A1* | 10/2019 | Aycock | G06T 7/70 |
| 2020/0200538 A1 | 6/2020 | Ramirez et al. | |
| 2023/0098784 A1* | 3/2023 | Hutchin | G01V 7/16 |
| | | | 701/513 |
| 2024/0401953 A1* | 12/2024 | Li | G01C 21/1656 |

OTHER PUBLICATIONS

E. Levine, "Review of large radio astronomy arrays," 2011 IEEE International Conference on Microwaves, Communications, Antennas and Electronic Systems (COMCAS 2011), Tel Aviv, Israel, 2011, pp. 1-4, doi: 10.1109/COMCAS.2011.6105766. (Year: 2011).*

Meysam Izadmehr and Mehdi Khakian Ghom, "Positioning optimization of a low cast portable star tracker up to 200 meters accuracy," Department of Energy Engineering and Physics, Amirkabir University of Technology, Tehran, Iran, 2018 (Year: 2018).*

R. E. Howard, D. Jones, W. Blume and C. Seybold, "ALFA: a constellation mission for low frequency radioastronomy," 2000 IEEE Aerospace Conference. Proceedings (Cat. No. 00TH8484), Big Sky, MT, USA, 2000, pp. 1-8 vol. 7, doi: 10.1109/AERO.2000. 879268. (Year: 2000).*

B. Cecconi et al., "NOIRE study report: Towards a low frequency radio interferometer in space," 2018 IEEE Aerospace Conference, Big Sky, MT, USA, 2018, pp. 1-19, doi: 10.1109/AERO.2018. 8396742. (Year: 2018).*

International Search Report for PCT/US2024/037697 filing date Jul. 12, 2024.

\* cited by examiner

40

ACQUIRE RADIO IMAGES ⌐70

CORRECT TO HORIZON (HEADING) ⌐72

CROSS–CORRELATE ⌐74

TIMESHIFT TEMPLATE LATITUDE / LONGITUDE ⌐76

SELECT RESULTS ⌐80

FUSE TO OTHER NAVIGATION ⌐82

OUTPUT LATITUDE / LONGITUDE (HEADING) ⌐84

NAVIGATION SYSTEM USING CELESTIAL RADIO EMISSIONS

STATEMENT REGARDING FEDERALLY SPONSORED RESEARCH OR DEVELOPMENT

BACKGROUND OF THE INVENTION

The present invention relates to navigational systems, and in particular to a navigational system that makes use of background radio emissions from celestial objects.

Celestial navigation allows terrestrial location to be determined by measuring the angle of the sun, moon, or stars in the sky. Visual celestial navigation, using a sextant for angle measurements, has been practiced for hundreds of years and, with the development of precise clocks, is able to provide both longitude and latitude measurements.

The limitations in accuracy of conventional celestial navigation and the challenge presented to such navigation when there is extensive cloud cover has led to the adoption of alternative technologies including inertial guidance systems (INS) and satellite based guidance systems (GPS).

Inertial guidance systems use gyroscopically stabilized or compensated accelerometers to determine a cumulative displacement over time from a known location. Such systems are largely indifferent to weather conditions but suffer from drift limiting their accuracy over time. GPS employs a constellation of satellites transmitting time signals to a GPS receiver at a terrestrial location. A calculation of a time-of-flight of these signals allows the terrestrial GPS receiver to locate its position by triangulation or multi-lateralization.

The convenience and accuracy of GPS has led to its widescale adoption for both commercial and military purposes. Nevertheless, GPS navigation is susceptible to interruption, for example, from sunspot activity or jamming, making sole reliance on GPS for critical navigational information of concern.

SUMMARY OF THE INVENTION

The present inventor has recognized that radio signals from the galactic plane and solar system bodies can provide a reliable alternative to GPS navigation during periods of interruption. Such radio signals can be detected by a simple antenna arrays, may pass through cloud cover, and are available both day and night avoiding the principal disadvantages of visual celestial navigation.

Specifically, the present invention provides a celestial navigational system having a clock providing a current time and an antenna system at a terrestrial location providing a radio image of the sky within a range from 29 MHz to 30 GHz. A template image is provided of expected celestial radio emissions within the range from at least one celestial object and referenced to a terrestrial longitude and latitude and a reference time. An electronic computer operates to match the radio image to the template image to determine a longitude and latitude of the terrestrial location based on a positional offset between the template image and the radio image and a time offset between the current time and the reference time.

It is thus a feature of at least one embodiment of the invention to employ celestial radio signals for celestial navigation particularly at night or times of cloudy weather avoiding the problems of visual celestial navigation.

The antenna system may be an array of spatially separated antennas generating the radio image by interferometry.

It is thus a feature of at least one embodiment of the invention to provide a simple interferometric method of radio imaging resistant to failure of a mechanically swept antenna.

The antenna array may provide a two-dimensional array of antennas separated along two perpendicular axes.

It is thus a feature of at least one embodiment of the invention to provide a wide area celestial image suitable for correlation of low-strength celestial radiofrequency signals and low-resolution images.

The template image may describe the radio emissions from the galactic plane.

It is thus a feature of at least one embodiment of the invention to allow for robust navigational information at any time anywhere in the world based on a simple static template of radio emissions from the celestial sphere.

The celestial navigation system may alternatively or in addition provide an ephemeris linking solar system bodies to time and location in the sky, and the template image may provide expected radio emissions within the range from a solar system body referenced to a longitude and latitude and a reference time derived from the ephemeris and the current time.

It is thus a feature of at least one embodiment of the invention to provide the benefits of radio imaging for celestial navigation from conventional solar system bodies.

The celestial navigation system may include multiple template images of expected radio emissions from frequency bands from different celestial objects. Here the electronic computer may select among multiple templates to determine a longitude and latitude of the terrestrial location, for example, according to the strength of the matching.

It is thus a feature of at least one embodiment of the invention to provide multiple independent celestial navigation inputs based on frequency decomposition of celestial signals for improved navigational flexibility and reliability.

The template image may be further referenced to an Earth-reference vector, and the celestial imaging system may further include an inclinometer for measuring an acquisition angle of the radio image with respect to an Earth-reference vector at a time of acquisition of the radio image. Terrestrial location can be determined from a positional offset between the template image and the radio image, a time offset between the current time and the reference time, and an angular offset between the Earth-reference vector and the acquisition angle of the radio image.

It is thus a feature of at least one embodiment of the invention to provide a navigational system resistant to errors caused by a shifting platform.

The Earth-reference vector may be selected from the group consisting of a magnetic vector measuring the geomagnetic field and a gravitational vector measuring gravitational acceleration.

It is thus a feature of at least one embodiment of the invention to provide a navigational system resistant to errors caused by ambiguity between gravitational and platform acceleration.

The celestial navigation system may further include an inertial guidance system and the electronic computer may use the determined longitude and latitude of the terrestrial location to correct for a drift in the inertial guidance system.

It is thus a feature of at least one embodiment of the invention to provide a navigational signal that provides instantaneous navigational information from the inertial guidance system corrected by a more slowly evolving signal from the celestial navigation system, exploiting the relative advantages of each system.

The celestial navigation system may further include a global positioning system outputting a GPS longitude and latitude of the terrestrial location, and the electronic computer may output one of the determined longitude and latitude of the terrestrial location and GPS longitude and latitude of the terrestrial location based on an assessment of the reliability of the respective longitude and latitude.

It is thus a feature of at least one embodiment of the invention to provide a system that can compensate for temporary outages of a GPS.

The electronic computer may also match the radio image to the template image to determine a heading at the terrestrial location from a rotational offset between the template image and the radio image and a time offset between the current time and the reference time.

It is thus a feature of at least one embodiment of the invention to extract heading information from the matching process.

The antenna system may provide a shield operating to cancel radio signals in the range directed upward toward the antenna array.

It is thus a feature of at least one embodiment of the invention to provide a radio wave based celestial imaging system resistant to intentional and unintentional interference from terrestrial sources including the navigational platform.

These particular objects and advantages may apply to only some embodiments falling within the claims and thus do not define the scope of the invention.

DETAILED DESCRIPTION OF THE PREFERRED EMBODIMENT

Figures 1, 2:
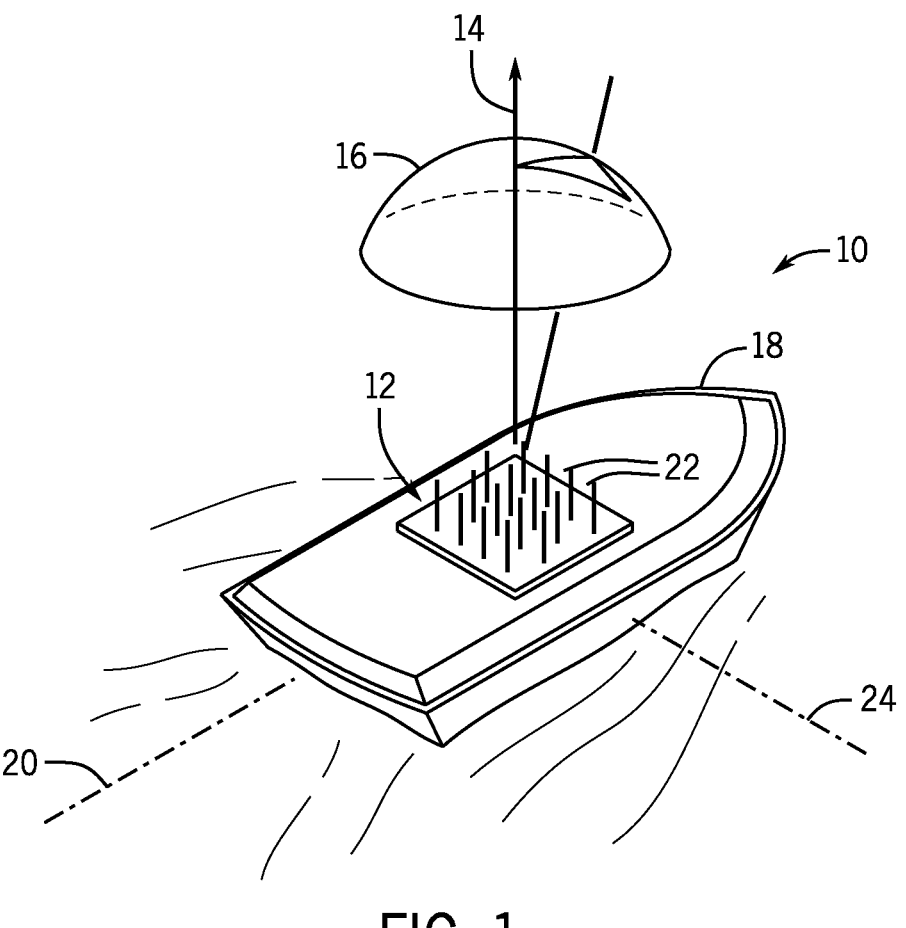
FIG. 1 is a perspective view of a ship, being one example of an application of the present invention, the invention providing an antenna array for making interferometric measurements at a range of angles about a reference vertical to determine the location of the ship.
FIG. 2 is a functional block diagram of the navigation system of FIG. 1 showing a high-speed data acquisition system working in conjunction with other sensor systems to provide data to an electronic computer to produce a navigation signal.

Referring now to FIG. 1, a radiofrequency celestial navigation system 10 may provide an antenna array 12 positioned to receive radio signals from the sky. In this respect, the antenna array 12 may be steered mechanically, electrically, or as a phased array to collect radiofrequency signals from the celestial sphere as bounded by the horizon and centered about a vertically oriented Earth-reference vector 14. The celestial sphere is an imaginary spherical surface surrounding the Earth on which celestial bodies can be mapped. The radiofrequency signals will be used to generate areal images of the sky having pixels with unique angular coordinates indicating a radiofrequency strength in a particular frequency band as will be discussed below.

The antenna array 12 may be positioned on a terrestrial transport 18 such as a ship, plane, or vehicle to be exposed to the sky for the reception of radio signals with the transport 18 moving along a heading 20 and will be used to provide navigational information indicating the terrestrial location of the transport 18.

Referring now also to FIG. 2, the antenna array 12 may employ a set of individual antennas 22 spaced in separation along two horizontal perpendicular directions to collect radiofrequency signals 16 over a two-dimensional area depicted. In one embodiment, the antennas 22 may be separated along the heading 20 of motion of the transport 18 and along a transverse axis 24 perpendicular to the heading 20.

The antenna array 12 may be positioned above an electrical shield 30 providing a conductive plane to reject radiofrequency signals 16 received outside of the celestial sphere above the horizon. Shielding may also be provided mathematically through the phased array processing of the collective radiofrequency signals, for example, distinguishing between a plane wave from a celestial object from a more spherical wave from local or terrestrial sources.

Each antenna 22 may be connected to a wideband buffer amplifier 32 and a high-speed digital-to-analog converter 34 providing the phase-precise radiofrequency signal 16 to a phased array processor 35, for example, implemented in discrete circuitry or an FPGA. The phased array processor 35, in turn, operates to provide a phase sensitive combination of the radiofrequency signals creating a synthetic aperture that sweeps through the visible sky to generate image data 36 communicated to a processing computer 38.

More generally, the images 46 may be derived through a variety of interferometric techniques either via digital beamforming which would allow simultaneous sampling of the sky as described above, or alternatively, via microwave circuitry used to electronically sweep the sky by introducing time delays in the channels. Such a system could be produced in handheld size. The invention may also provide one or more mechanically swept directional antennas or a combination of these approaches.

The radiofrequency data 36 represent radiofrequency energy collected in a frequency range from 10 m to 1 cm (about 29 MHz to 30 GHZ) matching a window of radio transmissions through the Earth's atmosphere and cloud cover and accommodating spectra of celestial objects including stars and other objects in the galactic plane as well as the sun and the moon.

The processing computer 38 may spectrally decompose the radiofrequency data 36 to provide a set of images 46 associated with specific subsets of the above described frequency range associated with particular celestial bodies. Alternatively or in addition, the amplifiers 32 may be narrowband amplifiers swept under the control of the processing computer 38 through a desired frequency range to obtain a comparable spectral decomposition.

In one embodiment, separate images 46 will be provided capturing a decomposition of the radiofrequency data 36 into a celestial band representing the synchrotron radiation largely in a range from 50 MHz to 200 MHZ, and bands from 1 to 30 GHz characterizing blackbody radiation from objects such as the Sun, Moon, and Jupiter.

For processing the images 46, the processing computer 38 may include one or more processors 40 communicating with a computer memory 42 holding an operating program 44, as will also be discussed below, template files 48, and images 46 collected as described above.

The processing computer 38 may also provide interface circuitry allowing communication with ancillary sensors and systems including a precise clock 50 providing a navigation-accurate time signal suitable for deducing date and time, a compass 53, for example, a gyro compass for deducing heading 20 with respect to the Earth's polar axis, and inclinometer 54 for measuring the angle of the antenna array 12 with respect to the Earth-reference vertical 14. The clock 50 is used to timestamp each of the images 46 as they are acquired and for additional calculations as will be described. The inclinometer 54 may be used to register the orientation of each of the images 46 with respect to the Earth-reference vertical before a correlation process described below. Generally, the Earth-reference vertical may be derived using an inclinometer 54 measuring a magnetic vector of the geomagnetic field in three-dimensions, optionally augmented with a gyroscope such as a 3-D MEMS gyroscope (and corrected with respect to general knowledge about spatial positioning on the Earth In the geomagnetic field) or by an inclinometer measuring gravitational acceleration or combination of both. More generally, the Earth-reference need not be a vertical but may be any vector having a fixed angular relationship to vertical.

The processing computer 38 may also communicate with auxiliary navigational systems including an inertial guidance system 56 and a conventional GPS 58 to receive values of latitude and longitude therefrom. Navigational output can be provided, for example, on a display 52 providing, for example, a graphical screen displaying a located point on a map or tabular longitude and latitude and heading data.

Figure 3:
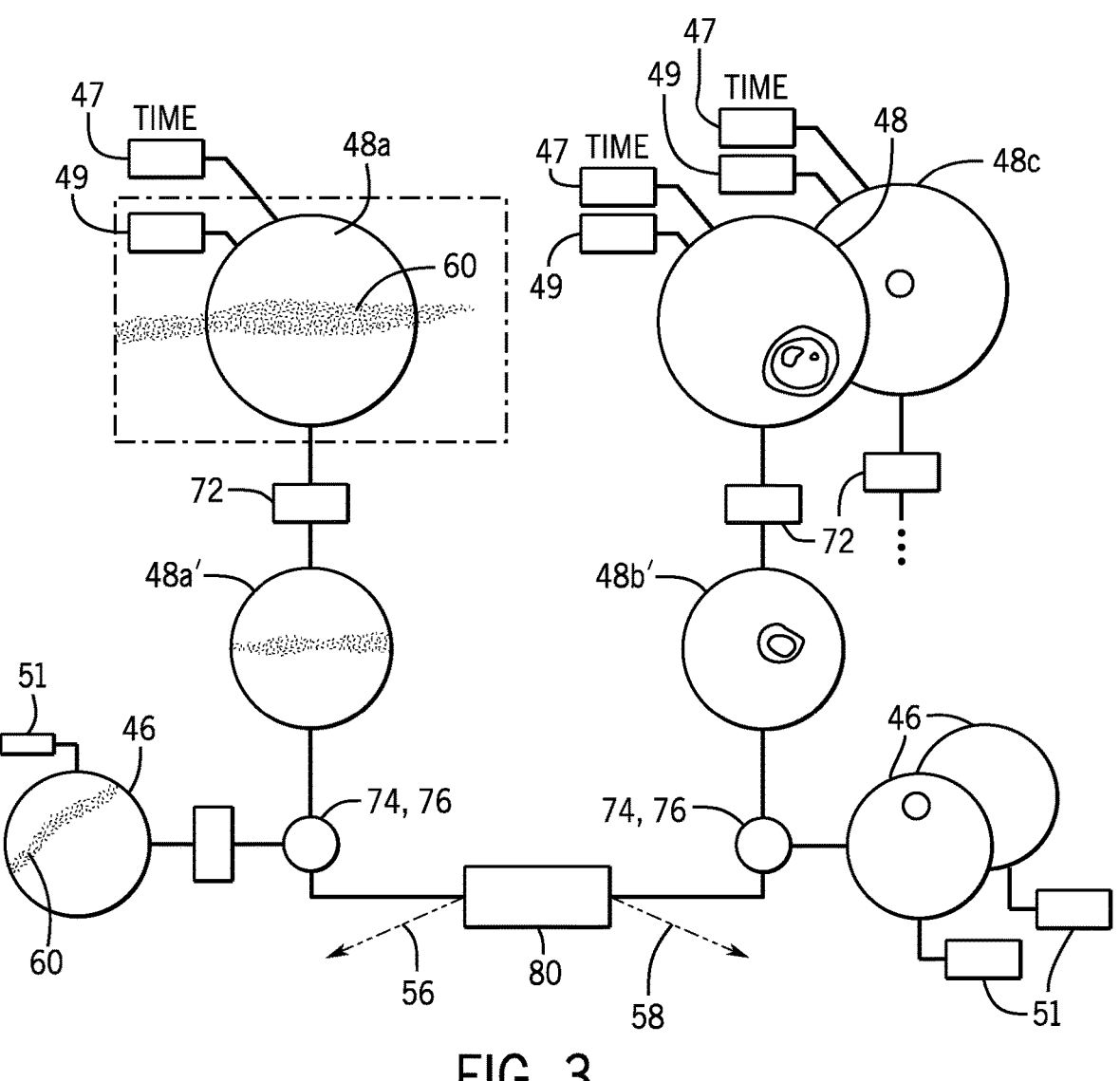
FIG. 3 is a dataflow diagram showing a correlation of static and variable templates for different celestial objects in one embodiment of the invention to provide a robust navigational determination.

Referring now to FIG. 3, the processing computer 38 will hold multiple image templates 48 comparable to images 46 recording image data for different spectral ranges of radio signals corresponding to the frequency ranges as discussed above but covering the entire celestial sphere. Each template 48 will be linked to a fixed historical time value 47 and a particular orientation 49 at that time value with respect to the surface of the Earth. A template 48a, for example, may provide a radiofrequency energy mapping for the galactic plane 60 whereas templates 48b and 48c may provide similar mappings for different frequency bands and for different celestial bodies including, for example, the sun or the moon or a planet. Generally each of these templates 48 may be static in representation and may be subject to rotational transformations as needed.

Figure 4:
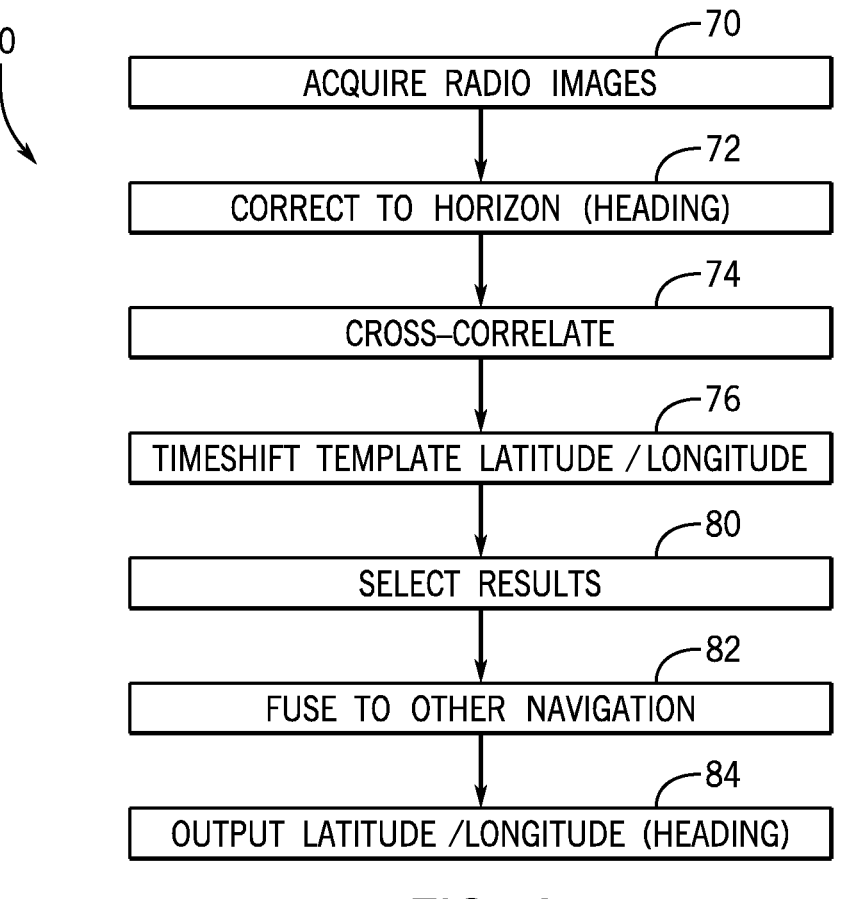
FIG. 4 is a flowchart of a program executed by the computer of FIG. 2.

Referring now also to FIG. 4, the celestial navigation system 10 may operate according to the stored program 44 to acquire radiofrequency images 46 at specific recorded times per process block 70 using the antenna array 12. The radiofrequency images 46, as discussed above, may then be spectrally decomposed into different frequency bands associated with the different templates 48. At process block 72, the radiofrequency images 46 are adjusted to account for any rocking or tipping of the transport 18 at the time of acquisition by shifting the data or by recording a pixel offset with respect to the Earth-referenced vertical 14 that will be accommodated during correlation with a template 48. Optionally, the radiofrequency images 36 may be pre-adjusted rotationally to provide a common axial orientation with respect to the heading 20.

At process block 74, the templates 48 (or the images 46) may be adjusted rotationally and in translation along multiple axes to maximize the correlation between the templates 48 and a corresponding image 46 (having a corresponding frequency range). This correlation process observes the spherical nature of the data to provide the necessary "rollover" of template data as the images are shifted over its mathematically continuous surface.

This cross correlation may consider all possible angular and positional displacements of the image 46 with respect to the corresponding template 48 for a range of headings 20 but may practically use a windowed search based on a last known longitude and latitude for more rapid calculation. Pre-alignment of the images according to heading 20 can also reduce the necessary search space.

At process block 76, once the template 48 has been matched with its corresponding image 46, the time values 47 of the template 48 and the time stamps 51 image 46 are compared and used to adjust the longitude and latitude value 49 associated with the template 48 by that time difference. This adjustment is a simple rotational transformation being a function of time and the known rotation and movement of the Earth and results in a longitude and latitude (and heading) value for the image 46 and hence the transport 18.

At process block 80, the calculated maximum correlation in this matching processes may be reviewed to assess the relative accuracy of the longitude and latitude measurement and to provide a confidence value that provides either the selection of one such correlation (one such celestial body) for navigation or that blends the various readings from the different celestial bodies together according to this confidence. Generally this process will tend to use the galactic plane template when the sun and moon are not visible.

At process block 82 this longitude and latitude value may be fused with data from existing navigational systems of the inertial guidance system 54 and GPS 58 for example using a Kalman filter. In one embodiment, the inertial guidance system 54, for example, may use this celestial navigation value on a periodic basis (for example, every 10 minutes) to correct for its drift. In this way, the time window for the acquisition of the images 46 may be extended, for example, to many minutes to improve signal-to-noise ratio, with the inertial guidance system 54 providing guidance in between such times. The calculated longitudinal and latitude from the celestial guidance system (and from the inertial guidance system 54) can also be used to replace the signal from the GPS 58, for example, when navigational signals from these two sources differ from more than a predetermined threshold because of spoofing or the like interfering with the GPS 58. Similarly, the celestial navigation signal may be used when the radio signal from the GPS indicates insufficient power for reliable operation. Generally a hierarchy of navigational systems can be established with the computer selecting among them according to a likelihood of reliability based on correlation value, signal strengths, and time of drift.

At process block 84 the resulting longitude and latitude may be output to the display 52 (shown in FIG. 2) and an optional heading value deduced from the rotational alignment of the template 48 and image 46 which may be used, for example, to supplement a compass reading from compass 53.

In this description, the term template can be understood to include not only an image type template but other digital representations including, for example, those provided in a database of coordinates and values. Generally the template 48 for the galactic plane will include multiple points to allow robust registration with low signal strength whereas templates for the solar system bodies may be one or a few points representing a centroid or the like. The term image should be flexibly understood to express an array of values having two dimensions of angular offset or the like. The term terrestrial location includes locations on the surface of the Earth and within the Earth's atmosphere where celestial navigation would be expected to have value.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a microprocessor" and "a processor" or "the microprocessor" and "the processor," can be understood to include one or more microprocessors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

What I claim is:

1. A celestial navigational system comprising:
a clock providing a current time;
an antenna system providing a radio areal image of the sky within a range from 29 MHz to 30 GHz at a terrestrial location, the radio areal image linked to the current time;
a template areal image of expected celestial radio emissions within the range from at least one celestial object referenced to a terrestrial longitude and latitude and a reference time; and
an electronic computer matching the radio areal image to the template areal image to determine a longitude and latitude of the terrestrial location based on a positional offset between the template areal image and the radio areal image and a time offset between the current time and the reference time;
wherein the antenna system includes an array of spatially separated antennas providing signals to circuitry generating the radio areal image from the signals by interferometry; and
wherein the array of spatially separated antennas are a two-dimensional array of antennas separated along two perpendicular axes.

2. The celestial navigation system of claim 1 wherein the template areal image describes radio emissions from a galactic plane.

3. The celestial navigation system of claim 1 further including an ephemeris linking solar system bodies to time and location in the sky; and
wherein the template areal image provides expected radio emissions within the range from a solar system body referenced to the longitude and latitude of the terrestrial location and the reference time derived from the ephemeris and the current time.

4. The celestial navigation system of claim 1 further including:
multiple template areal images of expected radio emissions within different subsets of the range from different celestial objects referenced to a longitude and latitude and a reference time; and
an electronic computer that selects among the multiple template areal images having corresponding subsets of the range to perform a matching of the radio areal image to the selected template areal images to determine the longitude and latitude of the terrestrial location from the positional offset between a selected template areal image and the radio areal image and a time offset between the current time and the reference time of the selected template areal image.

5. The celestial navigation system of claim 1 wherein the template areal image is further referenced to an Earth-reference vector, and the celestial navigation system further includes an inclinometer for measuring an acquisition angle of the radio areal image with respect to an Earth-reference vector at a time of acquisition of the radio areal image, and wherein the electronic computer matches the radio areal image to the template areal image to determine the longitude and latitude of the terrestrial location from the positional offset between the template areal image and the radio areal image, the time offset between the current time and the reference time, and an angular offset between the Earth-reference vector and the acquisition angle of the radio areal image.

6. The celestial navigation system of claim 5, wherein the Earth-reference vector is selected from the group consisting of a magnetic vector measuring the geomagnetic field and a gravitational vector measuring gravitational acceleration.

7. The celestial navigation system of claim 1 further including an inertial guidance system, and wherein the electronic computer uses the determined longitude and latitude of the terrestrial location to correct for a drift in the inertial guidance system.

8. The celestial navigation system of claim 1 further including a global positioning system outputting a GPS longitude and latitude of the terrestrial location; and
wherein the electronic computer outputs one of the determined longitude and latitude of the terrestrial location and GPS longitude and latitude of the terrestrial location based on an assessment of a relative reliability between the determined longitude and latitude of the terrestrial location and the GPS longitude and latitude of the terrestrial location.

9. The celestial navigation system of claim 1 wherein the electronic computer matches the radio areal image to the template areal image to determine a heading at the terrestrial location from a rotational offset between the template areal image and the radio areal image and a time offset between the current time and the reference time.

10. The celestial navigation system of claim 1 wherein the radio areal image provides an areal image of multiple celestial objects over a range of angles in two dimensions.

11. The celestial navigation system of claim 1 wherein the antenna system provides a shield operating to block radio signals in the range directed upward toward the antenna array.

\* \* \* \* \*